(12) United States Patent
Klaka et al.

(10) Patent No.: US 8,621,421 B2
(45) Date of Patent: Dec. 31, 2013

(54) WORKFLOW VISUALIZATION

(75) Inventors: Eilene Hao Klaka, Redmond, WA (US); Phillip Allen, Kirkland, WA (US); Alexander Malek, Seattle, WA (US); Mark Nelson, Kirkland, WA (US); Philippe-Joseph Arida, Redmond, WA (US); Emil Cicos, Kirkland, WA (US); Helene Martin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 394 days.

(21) Appl. No.: 12/797,749

(22) Filed: Jun. 10, 2010

(65) Prior Publication Data

US 2011/0307856 A1  Dec. 15, 2011

(51) Int. Cl.
*G06F 9/44* (2006.01)
(52) U.S. Cl.
USPC ............ 717/104; 717/101; 717/105; 717/115
(58) Field of Classification Search
None
See application file for complete search history.

(56) References Cited

U.S. PATENT DOCUMENTS

| | | | |
|---|---|---|---|
| 6,226,787 B1 | 5/2001 | Serra et al. | |
| 6,380,951 B1* | 4/2002 | Petchenkine et al. | 715/736 |
| 7,464,366 B2 | 12/2008 | Shukla et al. | |
| 7,661,061 B2 | 2/2010 | Joshi | |
| 7,676,294 B2 | 3/2010 | Baier et al. | |
| 7,676,786 B2* | 3/2010 | Shenfield et al. | 717/104 |
| 8,504,979 B2* | 8/2013 | Gella et al. | 717/101 |
| 8,539,444 B2* | 9/2013 | Cao et al. | 717/115 |
| 2006/0005140 A1* | 1/2006 | Crew et al. | 715/760 |
| 2006/0074736 A1* | 4/2006 | Shukla et al. | 705/8 |
| 2006/0143591 A1* | 6/2006 | Hilerio et al. | 717/101 |
| 2007/0192118 A1 | 8/2007 | Bukovec | |
| 2007/0260499 A1* | 11/2007 | Greef et al. | 705/8 |
| 2008/0168420 A1* | 7/2008 | Sabbouh | 717/104 |
| 2008/0288917 A1* | 11/2008 | Lee et al. | 717/105 |
| 2009/0125875 A1* | 5/2009 | Schmitter et al. | 717/101 |
| 2010/0058343 A1* | 3/2010 | Kikuchi | 718/100 |

OTHER PUBLICATIONS

Chen et al., A model driven visualization platform for workflow, Sep. 2010, 6 pages.*
M. Decker, An UML profile for the modelling of mobile business processes and workflows, Sep. 2009, 7 pages.*
"AnalyGIS—Alteryx Workflow Visualization Tool", Retrieved at << http://www.analygis.com/products/alteryx.htm >>, Retrieved Date: Apr. 17, 2010, pp. 2.
"Visual Workflow Tracking", Retrieved at << http://msdn.microsoft.com/en-us/library/ee624139(VS.100).aspx >>, Retrieved Date: Apr. 19, 2010, pp. 2.
Moosad, Praveen., "Workflow Persistence", Retrieved at << http://www.c-sharpcorner.com/UploadFile/prvn_131971/WorkflowPersistence01242008233113PM/WorkflowPersistence.aspx >>, Jan. 25, 2008, pp. 23.
"Maximize Workflow Efficiency—FlowTracer™ Design Flow Development", Retrieved at << http://www.rtda.com/maximize-workflow-efficiency-flowtracer-design-flow-development >>, Retrieved Date: Apr. 19, 2010, pp. 2.
"StrutsGUI v3", Retrieved at << http://www.filesland.com/companies/Alien-Factory/StrutsGUI-v3.html >>, Retrieved Date: Apr. 19, 2010, p. 1.

* cited by examiner

*Primary Examiner* — Thuy Dao
(74) *Attorney, Agent, or Firm* — Turk IP Law, LLC

(57) ABSTRACT

A mechanism is provided for saving workflow execution state and mapping the execution state to graphical elements overlaid on a graphical drawing representing the workflow generated by a separate application. The graphical drawing may be a flowchart drawing corresponding to one or more paths of the workflow and the graphical elements may provide status information associated with individual steps or groups of steps of the workflow execution.

20 Claims, 8 Drawing Sheets

US 8,621,421 B2

WORKFLOW VISUALIZATION

BACKGROUND

A workflow includes a sequence of connected steps. It is a depiction of a sequence of operations, declared as work of a person, a group of persons, an organization of staff, or one or more simple or complex mechanisms. For control purposes, workflow may be a view on performed work under a particular aspect, thereby serving as a virtual representation of the performed work. The flow being described may often refer to a document that is being transferred from one step to another. In software engineering, workflow refers to detailed code specifications for running and coordinating a sequence of events. It can be a simple, linear sequence—the classic flow chart, for example—or a conditional, many-branched series of events linked together and interacting within complex feedback loops.

Workflows may be represented textually or graphically. Graphical representations of workflow may include elements such as flowchart components and typically display a workflow statically, i.e. the entire process from beginning to end or a temporal slice of the workflow. Textual representations may describe workflows statically or dynamically. For example, workflow reports may list temporal or otherwise progress along a workflow's path(s).

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a mechanism for saving workflow execution state and mapping the execution state to graphical elements overlaid on a graphical drawing representing the workflow generated by a workflow application. According to some embodiments, the graphical drawing may be a flowchart drawing corresponding to one or more paths of the workflow and the graphical elements may provide status information associated with individual steps of the workflow execution.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
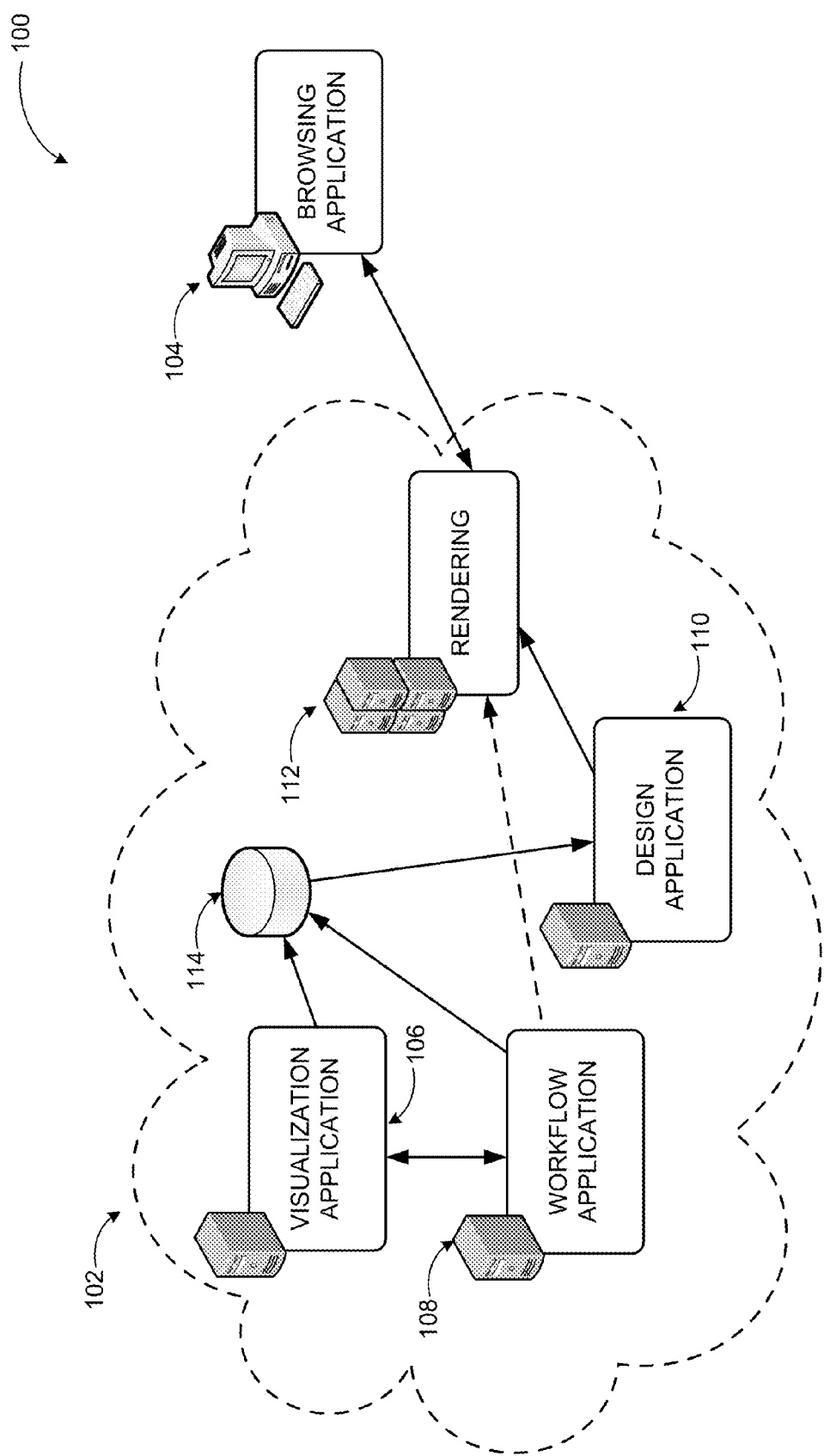
FIG. 1 illustrates an example system where workflow visualization according to embodiments may be implemented.

As briefly described above, workflow execution state may be saved and mapped to graphical elements that are overlaid on a graphical drawing such as a flowchart representing the static workflow. The graphical elements may provide status information associated with individual steps or groups of steps of the workflow execution. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing web based applications executing workflows, visualization applications, and similar ones. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network.

Figure 2:
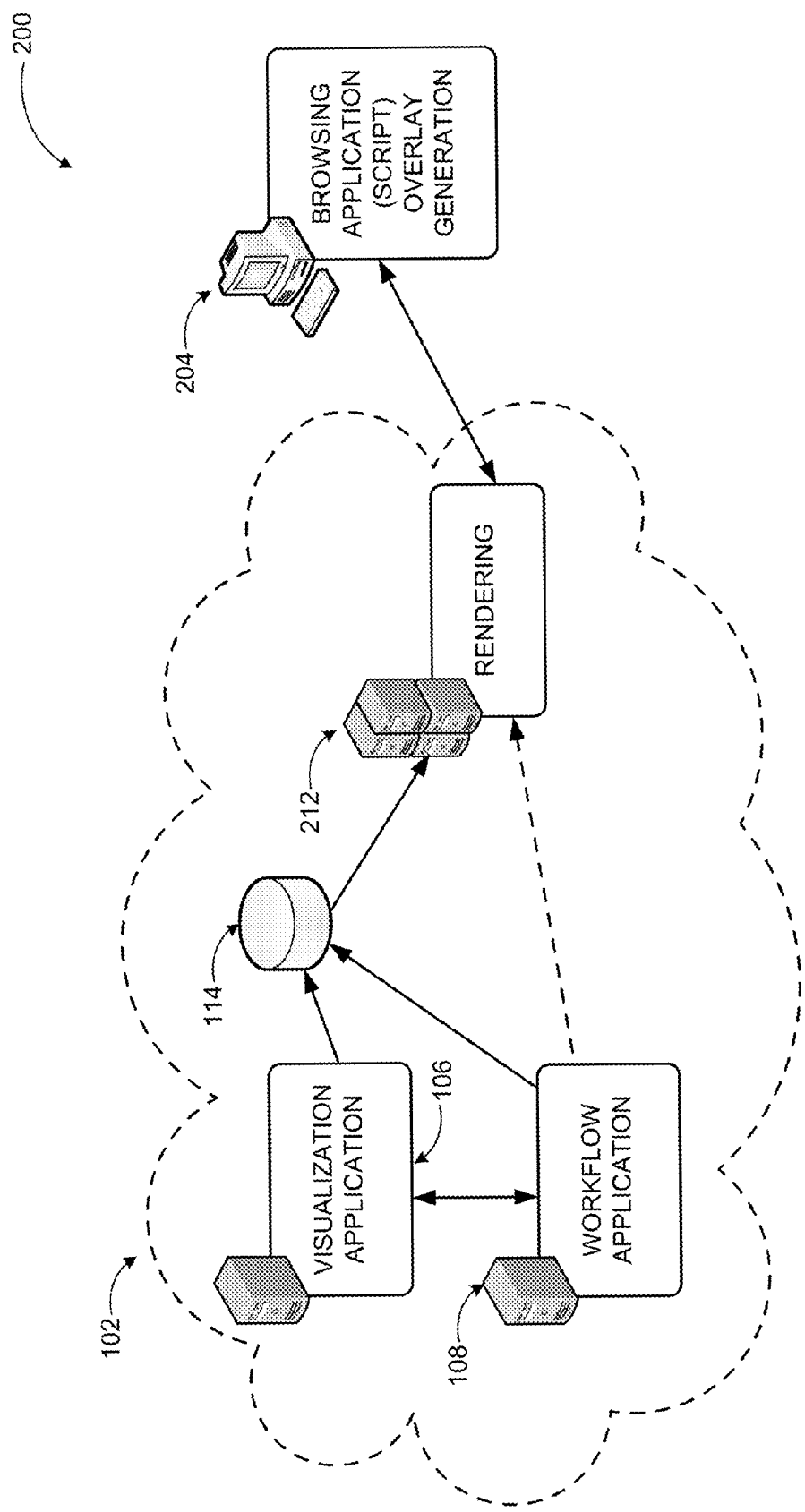
FIG. 2 illustrates another example system where workflow visualization according to embodiments may be implemented.

FIG. 1 illustrates an example system where workflow visualization according to embodiments may be implemented. A workflow visualization system according to embodiments may be implemented in a variety of configurations and environments. The example environment shown in diagram 100 is a hosted service environment, where distinct servers may be utilized to execute applications for performing individual tasks. The tasks may be performed in a combined manner by fewer or additional applications and/or servers according to other embodiments as shown in FIG. 2.

Diagram 100 includes the hosted workflow visualization service provided by four servers (or clusters), which execute a visualization application 106, a workflow application 108, a design application 110, and a rendering application 112, respectively. The servers and data store 114 for maintaining data related to the workflow and visualization operations may communicate over one or more networks 102. The workflow visualization including graphical elements representing workflow execution state(s) overlaid on a static workflow diagram may be rendered through a browsing application 104 at a client device. Of course, other applications may also be used to view the rendering of the visualized workflow.

For generating a drawing representing a workflow, visualization application 106 may expose one or more application programming interfaces (APIs) in a feature for importing and exporting workflows. Design application 110 may call the APIs, which take a structured file (e.g. an extended extensible Markup Language file such as xoml) and a rules file that represents the workflow execution logic/activity tree from workflow application 108. Visualization application 106 then creates a drawing that includes shapes and connectors to match the constructs explained by the structured data file.

The generated drawing may include shapes, each with identifiers. Visualization application 106 may create a new structured data file that includes the identifiers embedded in a description field in each activity that has a corresponding shape, and return the new structured data file, rules file, and the drawing file to design application 110. The files may be combined in a compressed package. Design application 110 may extract the structured data file and the rules file from the package, copy the shape identifiers into the original structured data file, and publish the updated structured data file, the rules file, and the drawing file to the rendering application 112. Design application 110 may understand the locations of the annotations and preserve them across editing operations.

FIG. 2 illustrates another example system where workflow visualization according to embodiments may be implemented. Diagram 200 includes some of the same elements such as servers executing visualization application 106, workflow application 108, as well as data store 114 and network(s) 102.

Differently from the system in FIG. 1, the workflow visualization system in diagram 200 may make the graphical elements representing workflow execution state(s) available to the browsing application 204 at the client device through rendering application 212. A script executed at the client device may receive the graphical elements and overlay them on a static diagram of the workflow rendering the annotated visualization. In other configurations, any of the other applications may be combined into a single application or executed as separate applications on the same server.

Figure 3:
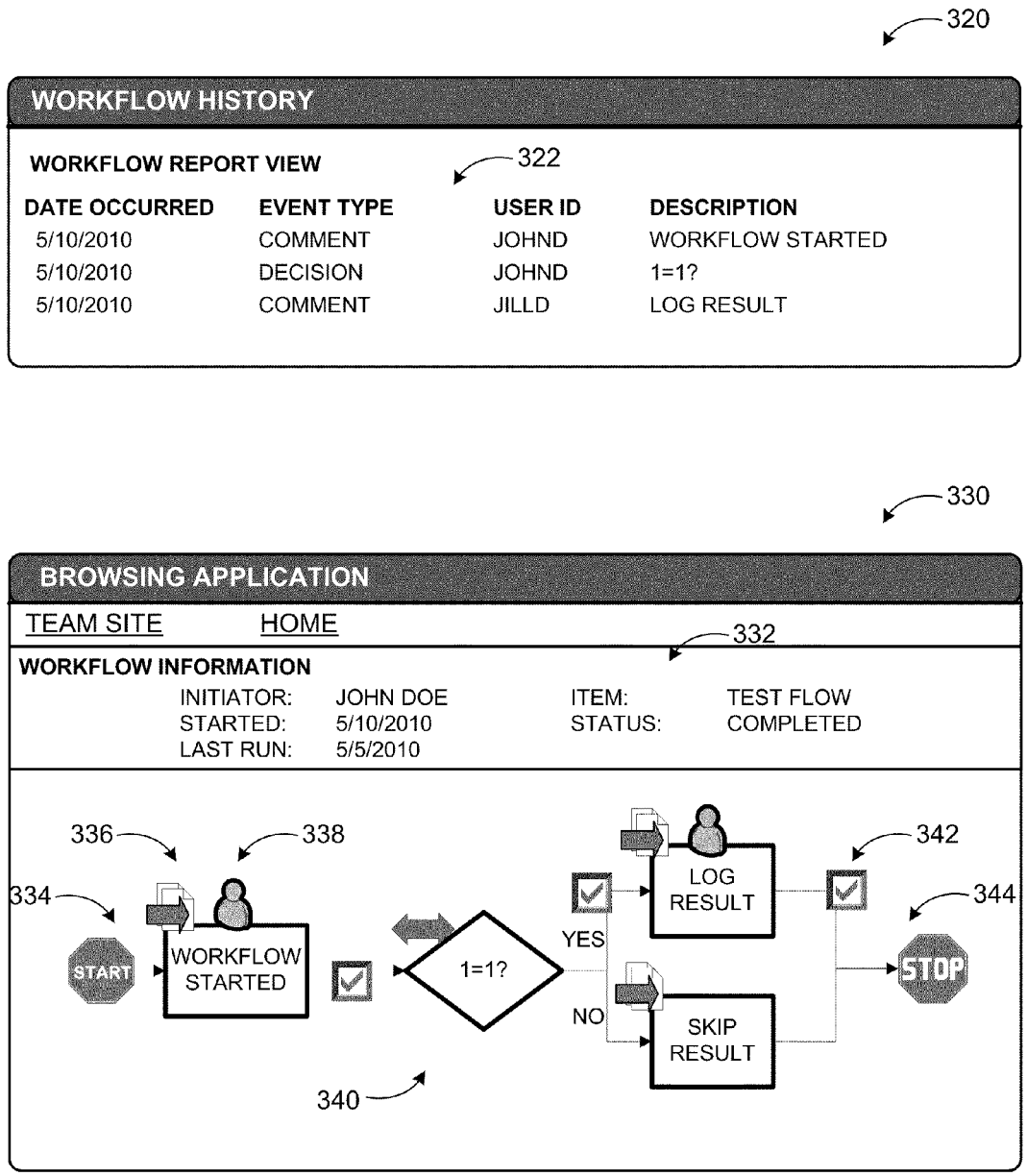
FIG. 3 illustrates an example textual visualization of a workflow execution and a graphical visualization of workflow execution.

FIG. 3 illustrates an example textual visualization of a workflow execution and a graphical visualization of workflow execution. Textual visualization 320 provides a listing 322 of workflow events, their dates, identifiers of associated users, and descriptions in chronological order. Additional information may also be provided. However, the visual effect of textual visualization is limited and may not provide a satisfactory user experience to some users. Furthermore, understanding relationships between workflow activities in a textual visualization is difficult if at all possible.

Graphical visualization 330 is an example of workflow visualization according to some embodiments. Graphical visualization 330 may include a textual summary 332 of the displayed workflow such as an initiator's name, a start date, an item descriptor, and a status. Diagram 340 of graphical visualization 330 may include a flowchart representation of the entire workflow from start 334 to stop 344 with various flowchart shapes representing different workflow activities. As discussed previously, shape information and content for the flowchart shapes may be received from a workflow application through a structured data file and the flowchart generated by a visualization application as a static diagram. The rules file may also impact the visualization. The static diagram may be annotated with graphical elements such as activity type icon 336, user icon 338, and status icon 342. For example, user icon 338 may identify a responsible user for a particular workflow activity. Status icon 342 may identify each step of the workflow as being completed or not. User icon 338 and status icon 342 are rendered at runtime, not during generation of the drawing. However, the activity type icon 336 is static in the drawing. Some or all of the graphical elements may be actionable, i.e. a user may be provided additional information (e.g. a user's name, address, etc.) by clicking on a particular graphical element.

Figure 4:
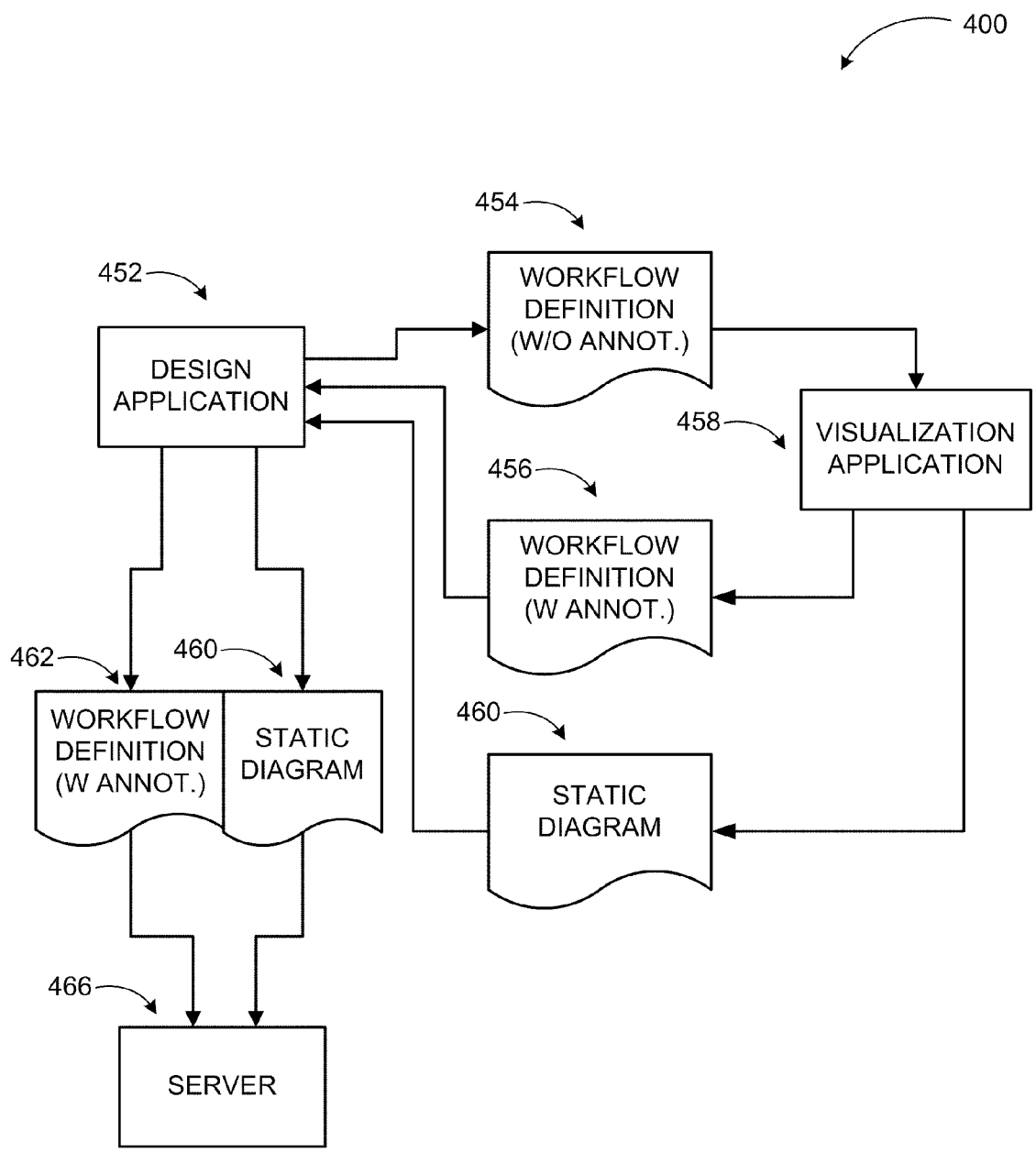
FIG. 4 is a block diagram illustrating major actions for visualizing workflow state at design time according to some embodiments.

FIG. 4 includes block diagram 400 illustrating major actions for visualizing workflow state at design time according to some embodiments. As discussed previously, a design application 452 may call APIs exposed by visualization application 458 and provide workflow definition data 454 without annotations. Visualization application 458 may create static diagram 460 including shapes and connectors to match the constructs explained by the workflow definition data 454. Alternatively, the definitions may include shape identifiers and the visualization application may preserve them.

Visualization application 458 may also create a new workflow definition with annotations 456 that includes shape identifiers for each activity with a corresponding shape, and return the workflow definition with annotations 456 to design application 452. Design application 452 may update the original workflow definition based on the annotations and publish the workflow definition 462 and the static diagram 460 to rendering server 466 for execution. Updating the original workflow by the design application 452 may include overwriting the entire original workflow definition with the full workflow definition 456 returned by the visualization application.

Figure 5:
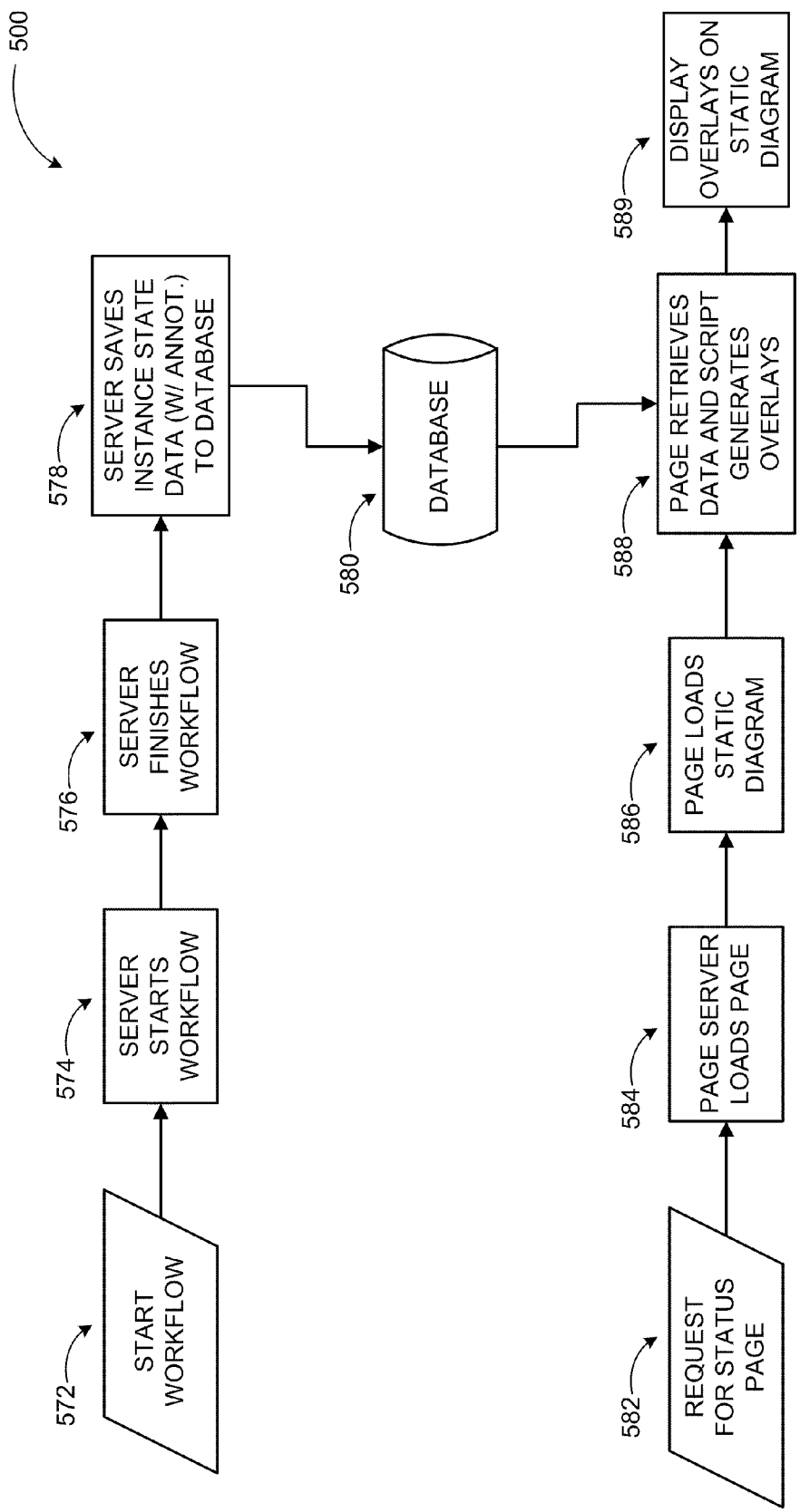
FIG. 5 is a block diagram illustrating major actions for visualizing workflow state at workflow runtime and render time according to some embodiments.

FIG. 5 includes block diagram 500 illustrating major actions for visualizing workflow state at workflow runtime and render time according to some embodiments. At a top level, the workflow runtime may be summarized as the workflow server starting to execute the workflow (574) upon receiving a start workflow indication 572. When the workflow server finishes executing the workflow (576), the server may save an instance of the state of the executed workflow 578 (with annotations) at a database 580. "Finishing" execution of the workflow may be completion or erroring of the workflow, or stopping the execution of the workflow in progress ("dehydration") with the ability to resume the execution later.

Thus, when the workflow is executed on the server, upon serialization, the workflow runtime may also store execution state data about the activities it has executed (e.g. in progress or completed) and a corresponding shape identifier mapped to an activity during drawing generation. In an example implementation, the execution state data may be stored as a string in a column called activity details along with the serialized binary for the workflow instance data. Of course, other storage methods may also be utilized. Every time the workflow instance executes, the server may update the activity details with the updated execution history of the activity tree.

Activities at render time may be summarized as receiving a request for a status page 582, page server loading the page 584, the page loading the static diagram representing the workflow 586, the page retrieving annotated workflow data and a script where the script generates the overlays 588, and displaying the overlays on the static diagram 589.

Thus, when a user opens the workflow status page to view the status of a workflow instance, the status page may display a hosted visualization application user interface that loads the static diagram for the workflow definition. The page may then load the activity details for the workflow instance from database 580, parse the shape identifier-activity state mappings, and use a script to display corresponding overlay graphics over shapes based on those mappings. According to some embodiments, default shapes from the visualization application may be modified or re-ordered to accommodate the annotations.

The different processes discussed in FIG. 1 through 5 such as generation of overlay elements (i.e. loading of existing images to be overlaid), generation of the static diagram, and interactions between components of the system may be performed at distinct hardware modules, software modules, or combinations of hardware and software. Furthermore, such modules may perform two or more of the processes in an integrated manner using the principles described herein.

Figure 6:
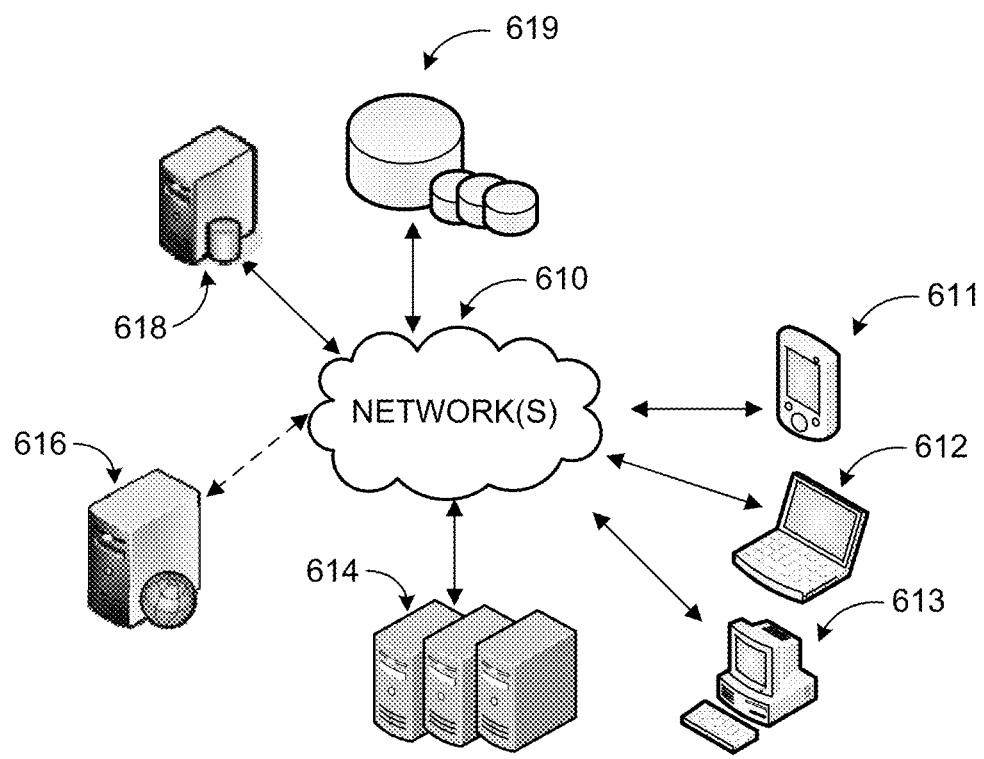
FIG. 6 is a networked environment, where a system according to embodiments may be implemented.

FIG. 6 is an example networked environment, where embodiments may be implemented. A platform for providing workflow visualization may be implemented via software executed over one or more servers 614 such as a hosted service. The platform may communicate with client applications on individual mobile devices such as a smart phone 611, laptop 612, desktop computer 613, or similar devices (client devices') through network(s) 610.

Client applications executed on any of the client devices 611-613 may interact with a hosted service providing workflow services from the servers 614, or on individual server 616. The hosted service may execute the workflow, coordinate generation of a static drawing representing the workflow, and create graphical elements corresponding to the workflow execution state to be overlaid over the static drawing. Relevant data such as workflow data and similar information may be stored and/or retrieved at/from data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also include (especially between the servers and the mobile devices) cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a platform providing workflow visualization. Furthermore, the networked environments discussed in FIG. 6 are for illustration purposes only. Embodiments are not limited to the example applications, modules, or processes.

Figure 7:
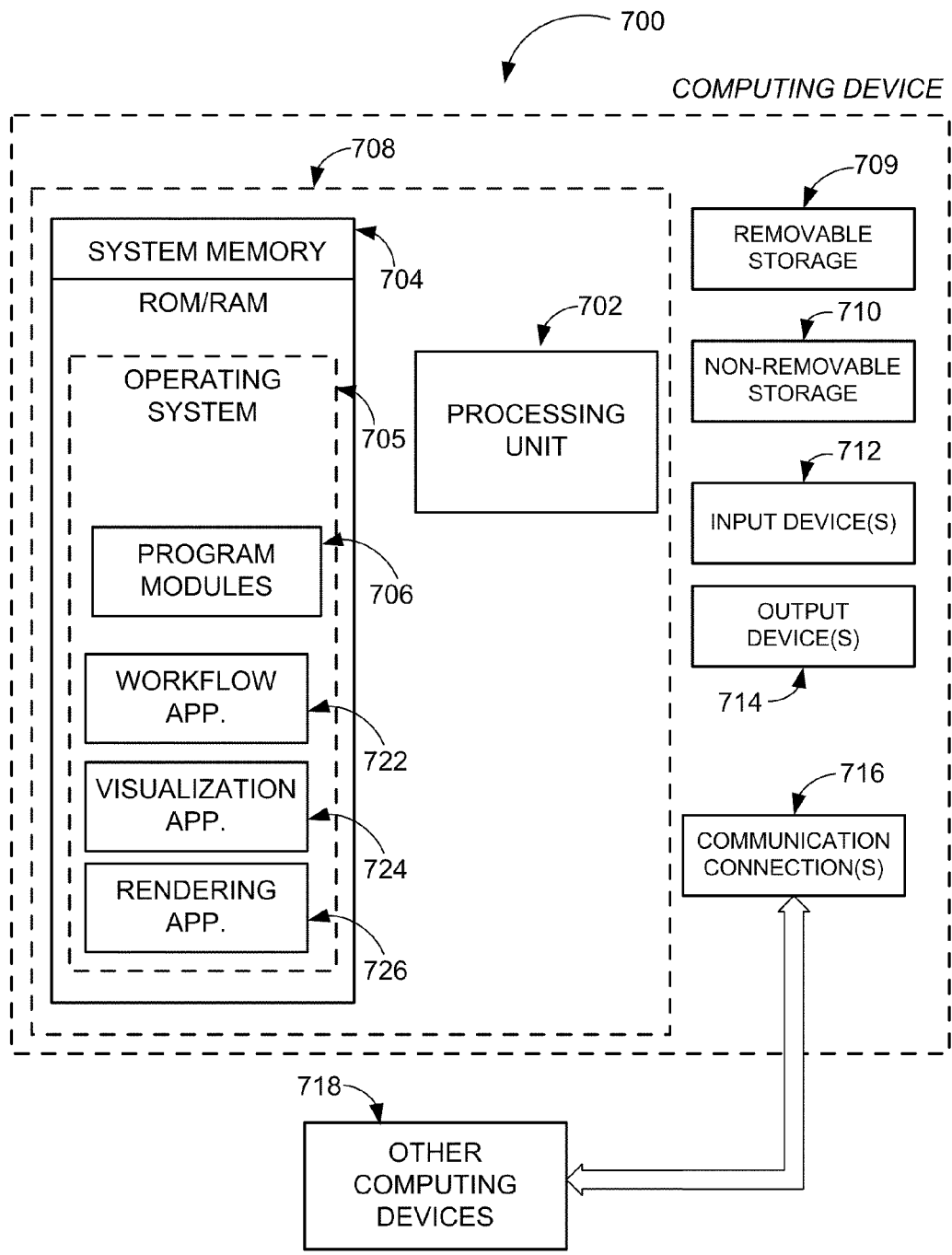
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be a server capable of providing workflow services according to embodiments and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. or similar ones. The system memory 704 may also include one or more software applications such as program modules 706, workflow application 722, visualization application 724, and rendering application 726.

Workflow application 722, visualization application 724, and rendering application 726 may in practice be executed on separate servers, client devices, or other components of a distributed system. Workflow application 722 may execute workflows, collect information associated with the execution, provide execution state data, and the like. Visualization application 724 may provide graphical visualizations including diagrams, flowcharts, shapes, and various other graphical elements. Rendering application 726 may render a visualized workflow, where graphical elements representing workflow execution state are overlaid on a static workflow drawing as discussed previously. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wired or wireless network in a distributed computing environment, a satellite link, a cellular link, a short range network, and comparable mechanisms. Other devices 718 may include computer device(s) that execute communication applications, other servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
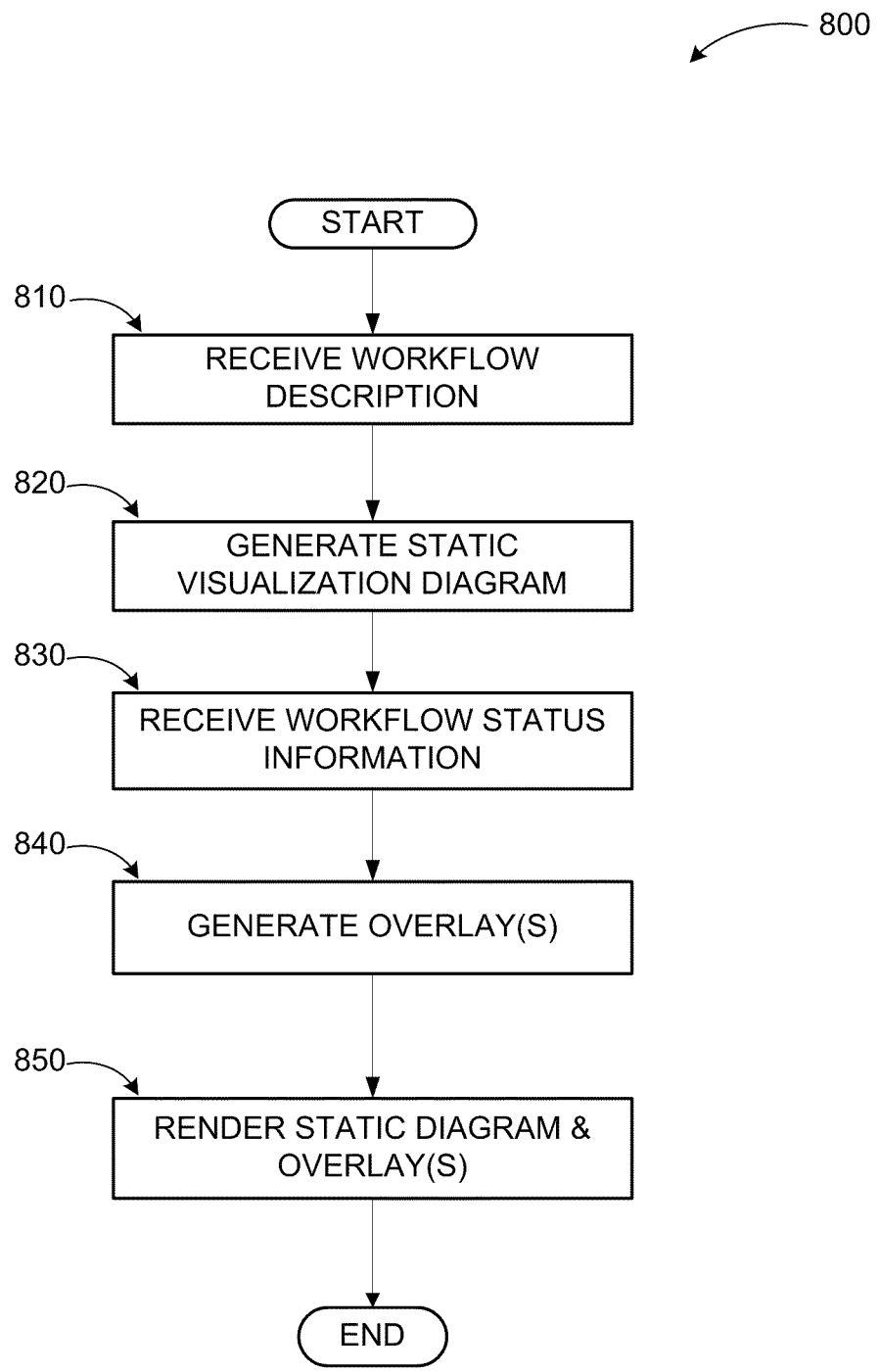
FIG. 8 illustrates a logic flow diagram for a process of visualizing workflow according to embodiments.

FIG. 8 illustrates a logic flow diagram for process 800 of visualizing workflow according to embodiments. Process 800 may be implemented as part of a hosted workflow service.

Process 800 begins with operation 810, where workflow description is received. Workflow description may be received at a visualization application in form of a structured data file (e.g. an extended XML file). At operation 820, a static visualization diagram may be generated based on the received workflow description. This may include mapping of shape identifiers to an activity tree, determining content for individual shapes of the diagram, etc. According to some embodiments, shapes forming the diagram may be modified from their default forms to accommodate workflow characteristics.

At operation 830, workflow execution state information may be received at workflow execution time. The information may be encoded into a workflow instance table. At operation 840, workflow execution state may be examined by retrieving the state from the instance table and interpreting the state information to generate the appropriate visualizations, which are overlaid on the static drawing and rendered for a requesting user at operation 850.

The operations included in process 800 are for illustration purposes. Providing workflow visualization may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing workflow visualization, the method comprising:

executing a workflow;
receiving a workflow definition;
generating a new workflow definition that includes mappings to a static diagram visualizing the workflow;
receiving workflow execution state information;
loading graphical elements for annotating the static diagram based on the workflow execution state information, wherein the static diagram includes shapes and connectors constructed to represent workflow activities and activity flows described in the workflow definition;
enabling a script within a rendering page for rendering the workflow visualization by overlaying the annotations on the static diagram;
including one of: a textual visualization and a graphical visualization within the workflow visualization;
presenting a list of workflow activities in a chronological order through the textual visualization wherein each entry in the list includes at least two of: a workflow activity, a date of the workflow activity, an identifier of a user associated with the workflow activity, and description of the workflow activity; and
presenting the workflow as a flowchart including a start of the workflow and an end of the workflow through the graphical visualization.

2. The method of claim 1, wherein the workflow definition includes a first structured data file including a hierarchical structure defining an activity tree for the workflow and a rules file defining conditions.

3. The method of claim 1, wherein the static diagram includes shapes and connectors constructed to represent the workflow activities and activity flows described in the workflow definition.

4. The method of claim 3, further comprising:
generating a second structured data file listing shape identifiers of the shapes in the static diagram and the corresponding workflow activities;
updating the first structured data file based on the second structured data file; and
employing the updated first structured data file, the rules file, and the static diagram to render the workflow visualization.

5. The method of claim 1, further comprising:
preserving locations of the annotations across edit operations on the workflow.

6. The method of claim 1, wherein the annotations include at least one of a user icon and a status icon.

7. The method of claim 6, wherein a status icon associated with each step of the workflow displays one of: "in progress", "complete", "errored", and "cancelled" status defined by the workflow execution state information.

8. The method of claim 1, wherein the annotations are actionable.

9. The method of claim 1, wherein the method further comprises at least one of: modifying and re-ordering default shapes of the static diagram to accommodate workflow activity content.

10. The method of claim 1, further comprising:
storing the annotations for a plurality of workflow execution states for subsequent rendering of workflow visualizations.

11. A system having a processor for providing workflow visualization, the system comprising:
a first server having a memory hosting a workflow application, the workflow application configured to:
execute a workflow; and
provide a workflow definition and a workflow execution state;

a second server having another memory hosting a rendering application, the rendering application configured to:
- load a static diagram visualizing the workflow based on the workflow definition, wherein the static diagram includes shapes and connectors constructed to represent workflow activities and activity flows described in the workflow definition;
- retrieve graphical elements for annotating the static diagram with status and user information based on the workflow execution state;
- enable a script within a rendering page overlay the static diagram with the graphical elements and render an annotated diagram;
- include one of: a textual visualization and a graphical visualization within the annotated diagram;
- present a list of workflow activities in a chronological order through the textual visualization wherein each entry in the list includes at least two of: a workflow activity, a date of the workflow activity, an identifier of a user associated with the workflow activity, and description of the workflow activity; and
- present the workflow as a flowchart including a start of the workflow and an end of the workflow through the graphical visualization.

12. The system of claim 11, wherein the visualization application exposes at least one API to receive includes a first structured data file defining a hierarchical structure of the workflow and a rules file defining workflow execution logic and activity tree.

13. The system of claim 12, wherein the visualization application is further configured to:
- generate a second structured data file listing shape identifiers of the shapes in the static diagram and corresponding workflow activities; and
- provide the second structured data file, the rules file, and the static diagram for updating the first structured data file.

14. The system of claim 13, wherein the second structured data file, the rules file, and the static diagram are provided in a compressed package.

15. The system of claim 13, further comprising a database for storing the updated first structured data file, the rules file, and the static diagram.

16. The system of claim 15, wherein the database includes a workflow instance table that includes a column for serialized binary data for the workflow instance and another column for workflow execution state and corresponding shape identifier for each workflow activity.

17. The system of claim 16, wherein the first and second servers are the same server.

18. A computer-readable storage medium with instructions stored thereon for providing workflow visualization, the instructions comprising:
- executing a workflow;
- providing a workflow definition and a workflow execution state;
- generating a new workflow definition that includes mappings to a static diagram visualizing the workflow;
- retrieving graphical elements for annotating the static diagram based on the workflow execution state, wherein the static diagram includes shapes and connectors constructed to represent workflow activities and activity flows described in the workflow definition;
- enabling a script within a rendering page to retrieve the static diagram and the graphical elements, wherein the graphical elements include at least one from a set of: an activity type icon, a user icon, and a status icon;
- rendering an annotated diagram representing the workflow based on the workflow execution state;
- including one of: a textual visualization and a graphical visualization within the annotated diagram;
- presenting a list of workflow activities in a chronological order through the textual visualization wherein each entry in the list includes at least two of: a workflow activity, a date of the workflow activity, an identifier of a user associated with the workflow activity, and description of the workflow activity; and
- presenting the workflow as a flowchart including a start of the workflow and an end of the workflow through the graphical visualization.

19. The computer-readable medium of claim 18, wherein the instructions further comprise:
- maintaining an execution history of an activity tree of the workflow; and
- updating the execution history in response to execution of each workflow instance.

20. The computer-readable medium of claim 18, wherein extensible markup language (XML) based files are used to store and transfer the workflow definition and the static diagram.

* * * * *